(12) United States Patent
Ho et al.

(10) Patent No.: US 10,604,678 B1
(45) Date of Patent: Mar. 31, 2020

(54) CHEMICAL MECHANICAL POLISHING OF TUNGSTEN USING A METHOD AND COMPOSITION CONTAINING QUATERNARY PHOSPHONIUM COMPOUNDS

(71) Applicant: Rohm and Haas Electronic Materials CMP Holdings, Inc., Newark, DE (US)

(72) Inventors: Lin-Chen Ho, Taipei (TW); Wei-Wen Tsai, Taichung (TW); Cheng-Ping Lee, Miaoli County (TW)

(73) Assignee: Rohrn and Haas Electronic Materials CMP Holdings, Inc., Newark, DE (US)

( * ) Notice: Subject to any disclaimer, the term of this patent is extended or adjusted under 35 U.S.C. 154(b) by 0 days.

(21) Appl. No.: 16/270,725

(22) Filed: Feb. 8, 2019

(51) Int. Cl.
 *C09G 1/02* (2006.01)
 *B24B 37/04* (2012.01)
(52) U.S. Cl.
 CPC ............. *C09G 1/02* (2013.01); *B24B 37/044* (2013.01)
(58) Field of Classification Search
 CPC ....................................................... C09G 1/02
 See application file for complete search history.

(56) References Cited

U.S. PATENT DOCUMENTS

2015/0376462 A1* 12/2015 Fu .................. C09K 3/1436
438/693

* cited by examiner

*Primary Examiner* — Roberts P Culbert
(74) *Attorney, Agent, or Firm* — John J. Piskorski

(57) ABSTRACT

A process and composition are disclosed for polishing tungsten containing select quaternary phosphonium compounds at low concentrations to at least reduce corrosion rate of tungsten. The process and composition include providing a substrate containing tungsten; providing a stable polishing composition, containing, as initial components: water; an oxidizing agent; select quaternary phosphonium compounds at low concentrations to at least reduce corrosion rate; a dicarboxylic acid, a source of iron ions; a colloidal silica abrasive; and, optionally a pH adjusting agent; providing a chemical mechanical polishing pad, having a polishing surface; creating dynamic contact at an interface between the polishing pad and the substrate; and dispensing the polishing composition onto the polishing surface at or near the interface between the polishing pad and the substrate; wherein some of the tungsten is polished away from the substrate, and corrosion rate of tungsten is reduced.

6 Claims, No Drawings

CHEMICAL MECHANICAL POLISHING OF TUNGSTEN USING A METHOD AND COMPOSITION CONTAINING QUATERNARY PHOSPHONIUM COMPOUNDS

FIELD OF THE INVENTION

The present invention is directed to the field of chemical mechanical polishing of tungsten using a method and composition containing select quaternary phosphonium compounds at low concentrations to at least reduce corrosion rate. More specifically, the present invention is directed to a method and composition of chemical mechanical polishing of tungsten using a method and composition containing select quaternary phosphonium compounds at low concentrations to at least reduce corrosion rate of tungsten by providing a substrate containing tungsten; providing a stable polishing composition, containing, as initial components: water; an oxidizing agent; select quaternary phosphonium compounds at low concentrations to at least reduce corrosion rate of tungsten; a dicarboxylic acid, a source of iron ions; a colloidal silica abrasive; and, optionally a pH adjusting agent; providing a chemical mechanical polishing pad, having a polishing surface; creating dynamic contact at an interface between the polishing pad and the substrate; and dispensing the stable polishing composition onto the polishing surface at or near the interface between the polishing pad and the substrate where some of the tungsten is polished away from the substrate.

BACKGROUND OF THE INVENTION

In the fabrication of integrated circuits and other electronic devices, multiple layers of conducting, semiconducting and dielectric materials are deposited on or removed from a surface of a semiconductor wafer. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes non-planar. Because subsequent semiconductor processing (e.g., metallization) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

Chemical mechanical planarization, or chemical mechanical polishing (CMP), is a common technique used to planarize substrates, such as semiconductor wafers. In conventional CMP, a wafer is mounted on a carrier assembly and positioned in contact with a polishing pad in a CMP apparatus. The carrier assembly provides a controllable pressure to the wafer, pressing it against the polishing pad. The pad is moved (e.g., rotated) relative to the wafer by an external driving force. Simultaneously therewith, a polishing composition ("slurry") or other polishing solution is provided between the wafer and the polishing pad. Thus, the wafer surface is polished and made planar by the chemical and mechanical action of the pad surface and slurry.

Substrates in the electronics industry possess a high degree of integration where semiconductor bases include multilayers of interconnected structures. The layers and the structures include a wide variety of materials such as single crystal silicon, polycrystalline silicon, tetraethyl orthosilicate, silicon dioxide, silicon nitride, tungsten, titanium, titanium nitride and various other conductive, semiconductive and dielectric materials. Because these substrates require various processing steps, including CMP to form a final multilayered interconnected structure, it is often highly desirable to utilize polishing compositions and processes that are selective for specific materials depending on the intended applications.

Chemical mechanical polishing has become a preferred method for polishing tungsten during the formation of tungsten interconnects and contact plugs in integrated circuit designs. Tungsten is frequently used in integrated circuit designs for contact/via plugs. Typically, a contact or via hole is formed through a dielectric layer on a substrate to expose regions of an underlying component, for example, a first level metallization or interconnect.

One problem associated with polishing metals such as tungsten is corrosion. The corrosion of tungsten is a common side-effect of CMP. During the CMP process the metal polishing slurry that remains on the surface of the substrate continues to corrode the substrate beyond the effects of the CMP. Sometimes corrosion is desired; however, in most semiconductor processes corrosion is to be reduced or inhibited. Corrosion may also contribute to surface defects such as pitting and key-holing. These surface defects significantly affect the final properties of the semiconductor device and hamper its usefulness.

Another problem which may be associated with polishing tungsten is excessive dishing of tungsten which can in-turn lead to erosion of dielectric material. The topographical defects which can result from such dishing and erosion can further lead to non-uniform removal of additional materials from the substrate surface, such as barrier layer material disposed beneath the conductive material or dielectric material and produce a substrate surface having less than desirable quality which can negatively impact the performance of the integrated circuit.

Therefore, there is a need for a CMP polishing method and composition for tungsten where at least the corrosion rate of tungsten is reduced.

SUMMARY OF THE INVENTION

The present invention provides a method of chemical mechanical polishing tungsten, comprising: providing a substrate comprising tungsten and a dielectric; providing a chemical mechanical polishing composition, comprising, as initial components: water; an oxidizing agent; a colloidal silica abrasive; a dicarboxylic acid or salt thereof; a source of iron (III) ions; and, optionally, a pH adjusting agent; and, a quaternary phosphonium compound in amounts of less than 1000 ppm but greater than 0 ppm, wherein the quaternary phosphonium compound has a formula:

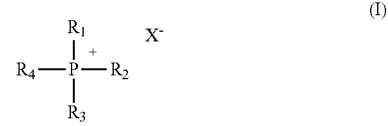

(I)

wherein $R_1$, $R_2$, $R_3$ and $R_4$ independently comprise hydrogen; linear or branched alkyl; linear or branched hydroxyalkyl; linear or branched alkoxy; linear or branched, aminoalkyl; linear or branched haloalkyl; linear or branched carboxyalkyl; acetonyl; allyl; substituted or unsubstituted aryl; substituted or unsubstituted arylalkyl; substituted or unsubstituted arylalkoxy; alkylphosphonium moiety; or a heterocyclic alkyl moiety; with the proviso that $R_1$, $R_2$, $R_3$ and $R_4$ are not all hydrogen at the same instance and all are not butyl at the same instance; and $X^-$ is a halide ion or hydroxide ion; providing a chemical mechanical polishing pad, having a polishing surface; creating dynamic contact at an interface between the chemical mechanical polishing pad and the substrate; and dispensing the chemical mechanical polishing composition onto the polishing surface of the chemical mechanical polishing pad at or near the interface between the chemical mechanical polishing pad and the substrate; wherein some of the tungsten is polished away from the substrate.

The present invention provides a chemical mechanical method of polishing tungsten, comprising: providing the substrate comprising tungsten and a dielectric; providing a chemical mechanical polishing composition, comprising, as initial components: water; an oxidizing agent; a colloidal silica abrasive having a negative zeta potential; a dicarboxylic acid or salt thereof; a source of iron (III) ions; and, optionally, a pH adjusting agent; and,
a quaternary phosphonium compound in amounts of less than 1000 ppm but greater than 0 ppm, wherein the quaternary phosphonium compound has a formula:

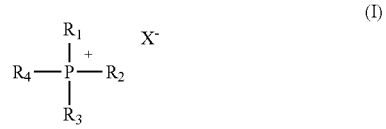

(I)

wherein $R_1$, $R_2$, $R_3$ and $R_4$ independently comprise hydrogen; linear or branched ($C_1$-$C_{20}$)alkyl; linear or branched hydroxy($C_1$-$C_{10}$)alkyl; linear or branched ($C_1$-$C_{10}$)alkoxy; linear or branched, amino($C_1$-$C_8$)alkyl; linear or branched halo($C_1$-$C_8$)alkyl; linear or branched carboxy($C_1$-$C_8$)alkyl; acetonyl; allyl; substituted or unsubstituted phenyl; substituted or unsubstituted phenyl($C_1$-$C_8$)alkyl; substituted or unsubstituted phenyl($C_1$-$C_8$)alkoxy; ($C_2$-$C_4$)alkylphosphonium moiety; or a heterocyclic($C_1$-$C_5$)alkyl moiety; with the proviso that $R_1$, $R_2$, $R_3$ and $R_4$ are not all hydrogen at the same instance and all are not butyl at the same instance; and $X^-$ is bromide, chloride, fluoride, iodide, or hydroxide ion; providing a chemical mechanical polishing pad, having a polishing surface; creating dynamic contact at an interface between the chemical mechanical polishing pad and the substrate; and dispensing the chemical mechanical polishing composition onto the polishing surface of the chemical mechanical polishing pad at or near the interface between the chemical mechanical polishing pad and the substrate; wherein some of the tungsten is polished away from the substrate; wherein the chemical mechanical polishing composition provided has a tungsten removal rate of ≥1,000 Å/min with a platen speed of 80 revolutions per minute, a carrier speed of 81 revolutions per minute, a chemical mechanical polishing composition flow rate of 125 mL/min, a nominal down force of 21.4 kPa on a 200 mm polishing machine; and, wherein the chemical mechanical polishing pad comprises a polyurethane polishing layer containing polymeric hollow core microparticles and a polyurethane impregnated non-woven subpad.

The present invention provides a chemical mechanical method of polishing tungsten, comprising: providing a substrate comprising tungsten and a dielectric; providing a chemical mechanical polishing composition, comprising, as initial components: water; an oxidizing agent; a colloidal silica abrasive having a negative zeta potential; malonic acid or salt thereof; a source of iron (III) ions; and, optionally, a pH adjusting agent; and, a quaternary phosphonium compound in amounts of 5 ppm to less than 1000 ppm, wherein the quaternary phosphonium compound has a formula:

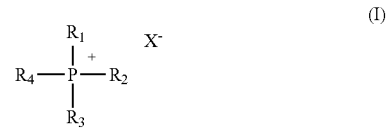

(I)

wherein $R_1$, $R_2$, $R_3$ and $R_4$ independently comprise hydrogen; linear or branched ($C_1$-$C_{16}$)alkyl; linear or branched hydroxy($C_1$-$C_8$)alkyl; linear or branched ($C_1$-$C_8$)alkoxy; linear or branched, amino($C_1$-$C_8$)alkyl; linear or branched halo($C_1$-$C_8$)alkyl; linear or branched carboxy($C_1$-$C_8$)alkyl; substituted or unsubstituted phenyl; substituted or unsubstituted phenyl($C_1$-$C_8$)alkyl; substituted or unsubstituted phenyl($C_1$-$C_8$)alkoxy; ($C_2$-$C_4$)alkylphosphonium moiety; or a heterocyclic($C_1$-$C_5$)alkyl moiety; with the proviso that $R_1$, $R_2$, $R_3$ and $R_4$ are not all hydrogen at the same instance and not all are butyl at the same instance; and $X^-$ is bromide, chloride or fluoride; providing a chemical mechanical polishing pad, having a polishing surface; creating dynamic contact at an interface between the chemical mechanical polishing pad and the substrate; and dispensing the chemical mechanical polishing composition onto the polishing surface of the chemical mechanical polishing pad at or near the interface between the chemical mechanical polishing pad and the substrate; wherein some of the tungsten is polished away from the substrate; wherein the chemical mechanical polishing composition provided has a tungsten removal rate of ≥1,000 Å/min with a platen speed of 80 revolutions per minute, a carrier speed of 81 revolutions per minute, a chemical mechanical polishing composition flow rate of 125 mL/min, a nominal down force of 21.4 kPa on a 200 mm polishing machine; wherein the chemical mechanical polishing pad comprises a polyurethane polishing layer containing polymeric hollow core microparticles and a polyurethane impregnated non-woven subpad.

The present invention provides a method of chemical mechanical polishing tungsten, comprising: providing the substrate comprising tungsten and a dielectric; providing a chemical mechanical polishing composition, comprising, as initial components: water; 0.01 to 10 wt % of an oxidizing agent, wherein the oxidizing agent is hydrogen peroxide; 0.01 to 10 wt % of a colloidal silica abrasive having a negative zeta potential; 100 to 1,400 ppm malonic acid or salt thereof; 100 to 1,000 ppm of a source of iron (III) ions, wherein the source of iron (III) ions is ferric nitrate nonahydrate; and, optionally, a pH adjusting agent;
a quaternary phosphonium compound in amounts of 5 ppm to 500 ppm, wherein the quaternary phosphonium compound has a formula:

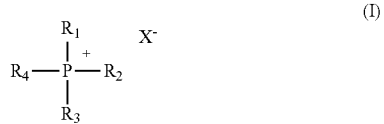

wherein $R_1$, $R_2$, $R_3$ and $R_4$ independently comprise hydrogen; linear or branched ($C_1$-$C_{16}$)alkyl; linear or branched hydroxy($C_1$-$C_4$)alkyl; linear or branched ($C_1$-$C_4$)alkoxy; linear or branched, amino($C_1$-$C_4$)alkyl; linear or branched halo($C_1$-$C_4$)alkyl; linear or branched carboxy($C_1$-$C_4$)alkyl; substituted or unsubstituted phenyl; substituted or unsubstituted phenyl($C_1$-$C_4$)alkyl; substituted or unsubstituted phenyl($C_1$-$C_4$)alkoxy; ($C_2$-$C_4$)alkylphosphonium moiety; or a heterocyclic($C_1$-$C_3$)alkyl moiety; with the proviso that $R_1$, $R_2$, $R_3$ and $R_4$ are not all hydrogen at the same instance and not all are butyl at the same instance; and $X^-$ is bromide, chloride or fluoride; wherein the chemical mechanical polishing composition has a pH of 1 to 7; providing a chemical mechanical polishing pad, having a polishing surface; creating dynamic contact at an interface between the chemical mechanical polishing pad and the substrate; and dispensing the chemical mechanical polishing composition onto the polishing surface of the chemical mechanical polishing pad at or near the interface between the chemical mechanical polishing pad and the substrate; wherein some of the tungsten is polished away from the substrate.

The present invention provides a method of chemical mechanical polishing tungsten, comprising: providing a substrate comprising tungsten and a dielectric; providing a chemical mechanical polishing composition, comprising, as initial components: water; 1 to 3 wt % of an oxidizing agent, wherein the oxidizing agent is hydrogen peroxide; 0.2 to 4 wt % of a colloidal silica abrasive having a negative zeta potential; 120 to 1,350 ppm of malonic acid; 250 to 400 ppm of a source of iron (III) ions, wherein the source of iron (III) ions is ferric nitrate nonahydrate; and, optionally, a pH adjusting agent; and, a quaternary phosphonium compound in amounts of 5 ppm to 250 ppm, wherein the quaternary phosphonium compound has a formula:

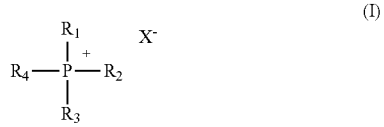

wherein $R_1$, $R_2$, $R_3$ and $R_4$ independently comprise hydrogen; linear or branched ($C_4$-$C_{16}$)alkyl; linear or branched hydroxy($C_1$-$C_4$)alkyl; linear or branched, amino($C_1$-$C_4$)alkyl; linear or branched halo($C_1$-$C_4$)alkyl; substituted or unsubstituted phenyl; or substituted or unsubstituted phenyl ($C_1$-$C_4$)alkyl; with the proviso that $R_1$, $R_2$, $R_3$ and $R_4$ are not all hydrogen at the same instance and are not all butyl at the same instance; and $X^-$ is bromide or chloride; wherein the chemical mechanical polishing composition has a pH of 2 to 3; providing a chemical mechanical polishing pad, having a polishing surface; creating dynamic contact at an interface between the chemical mechanical polishing pad and the substrate; and dispensing the chemical mechanical polishing composition onto the polishing surface of the chemical mechanical polishing pad at or near the interface between the chemical mechanical polishing pad and the substrate; wherein some of the tungsten is polished away from the substrate.

The present invention provides a chemical mechanical polishing composition for tungsten comprising, as initial components: water; an oxidizing agent; a colloidal silica abrasive; a dicarboxylic acid or salt thereof; a source of iron (III) ions; and, optionally, a pH adjusting agent; and, a quaternary phosphonium compound in amounts of less than 1000 ppm but greater than 0 ppm, wherein the quaternary phosphonium compound has a formula:

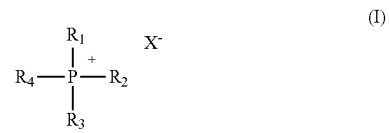

wherein $R_1$, $R_2$, $R_3$ and $R_4$ independently comprise hydrogen; linear or branched alkyl; linear or branched hydroxyalkyl; linear or branched alkoxy; linear or branched, aminoalkyl; linear or branched haloalkyl; linear or branched carboxyalkyl; substituted or unsubstituted aryl; substituted or unsubstituted arylalkyl; substituted or unsubstituted arylalkoxy; acetonyl; allyl; alkylphosphonium moiety; or a heterocyclic alkyl moiety; with the proviso that $R_1$, $R_2$, $R_3$ and $R_4$ are not all hydrogen at the same instance and all are not butyl at the same instance; and $X^-$ is a halide ion or hydroxide ion.

The present invention provides a chemical mechanical polishing composition for tungsten comprising, as initial components: water; an oxidizing agent; a colloidal silica abrasive having a negative zeta potential; a dicarboxylic acid or salt thereof; a source of iron (III) ions; and, optionally, a pH adjusting agent; and, a quaternary phosphonium compound in amounts of 5 ppm to less than 1000 ppm, wherein the quaternary phosphonium compound has a formula:

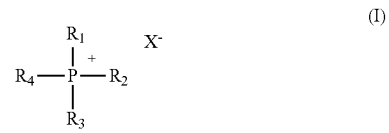

wherein $R_1$, $R_2$, $R_3$ and $R_4$ independently comprise hydrogen; linear or branched ($C_1$-$C_{20}$)alkyl; linear or branched hydroxy($C_1$-$C_{10}$)alkyl; linear or branched ($C_1$-$C_{10}$)alkoxy; linear or branched, amino($C_1$-$C_8$)alkyl; linear or branched halo($C_1$-$C_8$)alkyl; linear or branched carboxy($C_1$-$C_8$)alkyl; acetonyl; allyl; substituted or unsubstituted phenyl; substituted or unsubstituted phenyl($C_1$-$C_8$)alkyl; substituted or unsubstituted phenyl($C_1$-$C_8$)alkoxy; ($C_2$-$C_4$)alkylphosphonium moiety; or a heterocyclic($C_1$-$C_5$)alkyl moiety; with the proviso that $R_1$, $R_2$, $R_3$ and $R_4$ are not all hydrogen at the same instance and all are not butyl at the same instance; and $X^-$ is bromide, chloride, fluoride, iodide or hydroxide ion.

The present invention provides a chemical mechanical polishing composition for tungsten comprising: water; 0.01 to 10 wt % of an oxidizing agent, wherein the oxidizing agent is hydrogen peroxide; 0.01 to 10 wt % of a colloidal silica abrasive having a negative zeta potential; 100 to 1,400 ppm malonic acid or salt thereof; 100 to 1,000 ppm of a source of iron (III) ions, wherein the source of iron (III) ions is ferric nitrate; and, optionally, a pH adjusting agent, wherein the pH of the chemical mechanical polishing composition is from 1 to 7; and, a quaternary phosphonium compound in amounts of 5 ppm to 500 ppm, wherein the quaternary phosphonium compound has a formula:

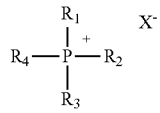

(I)

wherein $R_1$, $R_2$, $R_3$ and $R_4$ independently comprise hydrogen; linear or branched ($C_1$-$C_{16}$)alkyl; linear or branched hydroxy($C_1$-$C_4$)alkyl; linear or branched ($C_1$-$C_4$)alkoxy; linear or branched, amino($C_1$-$C_4$)alkyl; linear or branched halo($C_1$-$C_4$)alkyl; linear or branched carboxy($C_1$-$C_4$)alkyl; acetonyl; substituted or unsubstituted phenyl; substituted or unsubstituted phenyl($C_1$-$C_4$)alkyl; substituted or unsubstituted phenyl($C_1$-$C_4$)alkoxy; ($C_2$-$C_4$)alkylphosphonium moiety; or a heterocyclic($C_1$-$C_3$)alkyl moiety; with the proviso that $R_1$, $R_2$, $R_3$ and $R_4$ are not all hydrogen at the same instance and are not all butyl at the same instance; and $X^-$ is bromide, chloride, fluoride, iodide or hydroxide ion.

The present invention provides a chemical mechanical polishing composition, comprising, as initial components: water; 0.01 to 10 wt % of an oxidizing agent, wherein the oxidizing agent is hydrogen peroxide; 0.01 to 10 wt % of a colloidal silica abrasive having a negative zeta potential; 100 to 1,400 ppm malonic acid or salt thereof; 100 to 1,000 ppm of a source of iron (III) ions, wherein the source of iron (III) ions is ferric nitrate nonahydrate; and, optionally, a pH adjusting agent; a quaternary phosphonium compound in amounts of 5 ppm to 250 ppm, wherein the quaternary phosphonium compound has a formula:

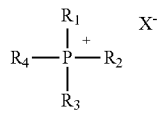

(I)

wherein $R_1$, $R_2$, $R_3$ and $R_4$ independently comprise hydrogen; linear or branched ($C_1$-$C_{16}$)alkyl; linear or branched hydroxy($C_1$-$C_4$)alkyl; linear or branched ($C_1$-$C_4$)alkoxy; linear or branched, amino($C_1$-$C_4$)alkyl; linear or branched halo($C_1$-$C_4$)alkyl; linear or branched carboxy($C_1$-$C_4$)alkyl; substituted or unsubstituted phenyl; substituted or unsubstituted phenyl($C_1$-$C_4$)alkyl; substituted or unsubstituted phenyl($C_1$-$C_4$)alkoxy; ($C_2$-$C_4$)alkylphosphonium moiety; or a heterocyclic($C_1$-$C_3$)alkyl moiety; with the proviso that $R_1$, $R_2$, $R_3$ and $R_4$ are not all hydrogen at the same instance and are not all butyl at the same instance; and $X^-$ is bromide, chloride or fluoride.

The present invention provides a chemical mechanical polishing composition for tungsten, comprising, as initial components: water; 1 to 3 wt % of an oxidizing agent, wherein the oxidizing agent is hydrogen peroxide; 0.2 to 4 wt % of a colloidal silica abrasive having a negative zeta potential; 120 to 1,350 ppm of malonic acid; 250 to 400 ppm of a source of iron (III) ions, wherein the source of iron (III) ions is ferric nitrate nonahydrate; and, optionally, a pH adjusting agent, wherein the pH of the chemical mechanical polishing composition is from 2 to 3; and, a quaternary phosphonium compound in amounts of 10 ppm 100 ppm, wherein the quaternary phosphonium compound has a formula:

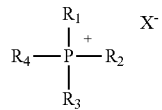

(I)

wherein $R_1$, $R_2$, $R_3$ and $R_4$ independently comprise hydrogen; linear or branched ($C_4$-$C_{16}$)alkyl; linear or branched hydroxy($C_1$-$C_4$)alkyl; linear or branched, amino($C_1$-$C_4$) alkyl; linear or branched halo($C_1$-$C_4$)alkyl; substituted or unsubstituted phenyl; substituted or unsubstituted phenyl ($C_1$-$C_4$)alkyl; with the proviso that $R_1$, $R_2$, $R_3$ and $R_4$ are not all hydrogen at the same instance and are not all linear butyl at the same instance; and $X^-$ is bromide or chloride.

The foregoing methods of the present invention use a stable chemical mechanical polishing composition comprising select quaternary phosphonium compounds at concentrations of less than 1000 ppm but greater than 0 ppm to at least reduce corrosion rate of tungsten (W) and polish the tungsten (W).

DETAILED DESCRIPTION OF THE INVENTION

As used throughout this specification the following abbreviations have the following meanings, unless the context indicates otherwise: ° C.=degrees Centigrade; g=grams; L=liters; mL=milliliters; μ=μm=microns; kPa=kilopascal; A=angstroms; mV=millivolts; DI=deionized; ppm=parts per million=mg/L; mm=millimeters; cm=centimeter; nm=nanometers; min=minute; rpm=revolutions per minute; lbs=pounds; kg=kilograms; W=tungsten; P=phosphorous; halide ions=bromide, chloride, fluoride and iodide; bromide=$Br^-$; chloride=$Cl^-$; fluoride=$F^-$; iodide=$I^-$; $X^-$=counter anion; $PPh_4$=tetraphenyl phosphonium bromide; P[6,6,6,14]=trihexyltetradecyl phosphonium chloride; $DiP^+$=1,3-propanediyl-bis(tripropylphosphonium) difluoride; $TriP^+$=1,3,5-tris[(tripropylphosphonium) methyl] benzene trifluoride; P[1,1,1,1]=tetrakis(hydroxymethyl) phosphonium chloride; P[4,4,4,16]=hexadecyltributyl phosphonium bromide; P[4,4,4,8]=tributyl-n-octylphosphonium bromide; P[4,4,4,12]=tributyl dodecylphosphonium bromide; P[4,4,4,4]=tetrabutylphosphonium hydroxide (hydroxide ion salt); ICP-OES=inductively coupled plasma optical emission spectroscopy; wt %=percent by weight; RR=removal rate; CS=Control Slurry; SC=comparative slurry.

The term "chemical mechanical polishing" or "CMP" refers to a process where a substrate is polished by means of chemical and mechanical forces alone and is distinguished from electrochemical-mechanical polishing (ECMP) where an electric bias is applied to the substrate. The term "TEOS" means the silicon dioxide formed from the decomposition of tetraethyl orthosilicate ($Si(OC_2H_5)_4$). The term "moiety" means a part or functional group of a molecule. The terms "a" and "an" refer to both the singular and the plural. All percentages are by weight, unless otherwise noted. All numerical ranges are inclusive and combinable in any order, except where it is logical that such numerical ranges are constrained to add up to 100%.

The method of polishing a substrate of the present invention uses a chemical mechanical polishing composition containing an oxidizing agent; a colloidal silica abrasive; a dicarboxylic acid or salt thereof; a source of iron (III) ions; and, optionally, a pH adjusting agent and a quaternary phosphonium compound in amounts of less than 1000 ppm but greater than 0 ppm, where the quaternary phosphonium compound has a formula:

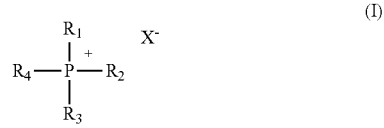

(I)

where $R_1$, $R_2$, $R_3$ and $R_4$ independently comprise hydrogen; linear or branched alkyl; linear or branched hydroxyalkyl; linear or branched alkoxy; linear or branched, aminoalkyl; linear or branched haloalkyl; linear or branched carboxyalkyl; substituted or unsubstituted aryl; substituted or unsubstituted arylalkyl; substituted or unsubstituted arylalkoxy; acetonyl; allyl; phosphoniumalkyl moiety; or a heterocyclic alkyl moiety; with the proviso that $R_1$, $R_2$, $R_3$ and $R_4$ are not all hydrogen at the same instance and not all are butyl at the same instance; and X$^-$ is a halide ion or hydroxide ion, to provide for the removal of tungsten from the substrate surface while reducing at least corrosion rate of the tungsten.

Preferably, the method of polishing a substrate of the present invention, comprises: providing the substrate, wherein the substrate comprises tungsten and a dielectric; providing a chemical mechanical polishing composition, comprising, preferably, consisting of, as initial components: water; an oxidizing agent, preferably in amounts of at least 0.01 wt % to 10 wt %, more preferably in amounts of 0.1 wt % to 5 wt %, still more preferably from 1 wt % to 3 wt %; a colloidal silica abrasive, preferably in amounts of 0.01 wt % to 10 wt %, more preferably from 0.05 wt % to 7.5 wt %, even more preferably from 0.1 wt % to 5 wt %, still more preferably from 0.2 wt % to 4 wt %; a dicarboxylic acid, salt thereof or mixtures thereof, preferably in amounts of 100 ppm to 1400 ppm, more preferably from 120 ppm to 1350 ppm; a source of iron (III) ions, preferably, wherein the source of iron (III) ions is ferric nitrate nonahydrate; and, optionally, a pH adjusting agent; preferably, wherein the chemical mechanical polishing composition has a pH of 1 to 7; more preferably, of 1.5 to 4.5; still more preferably, 1.5 to 3.5; most preferably, of 2 to 3; and a quaternary phosphonium compound in amounts of less than 1000 ppm but greater than 0 ppm, where the quaternary phosphonium compound has a formula:

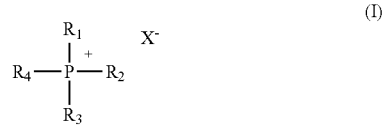

(I)

where $R_1$, $R_2$, $R_3$ and $R_4$ independently comprise hydrogen; linear or branched ($C_1$-$C_{20}$)alkyl; linear or branched hydroxy($C_1$-$C_{10}$)alkyl; linear or branched ($C_1$-$C_{10}$)alkoxy; linear or branched, amino($C_1$-$C_8$)alkyl; linear or branched halo($C_1$-$C_8$)alkyl; linear or branched carboxy($C_1$-$C_8$)alkyl; substituted or unsubstituted phenyl; substituted or unsubstituted phenyl($C_1$-$C_8$)alkyl; substituted or unsubstituted phenyl($C_1$-$C_8$)alkoxy; acetonyl; allyl; ($C_2$-$C_4$)alkylphosphonium moiety; or a heterocyclic($C_1$-$C_5$)alkyl moiety; with the proviso that $R_1$, $R_2$, $R_3$ and $R_4$ are not all hydrogen at the same instance and all are not butyl at the same instance; and X$^-$ is a halogen ion or hydroxide ion; providing a chemical mechanical polishing pad, having a polishing surface; creating dynamic contact at an interface between the chemical mechanical polishing pad and the substrate; and dispensing the chemical mechanical polishing composition onto the polishing surface of the chemical mechanical polishing pad at or near the interface between the chemical mechanical polishing pad and the substrate; wherein at least some of the tungsten is polished away from the substrate.

Preferably, in the method of polishing a substrate of the present invention, the substrate comprises tungsten and a dielectric. More preferably, the substrate provided is a semiconductor substrate comprising tungsten and a dielectric. Most preferably, the substrate provided is a semiconductor substrate comprising tungsten deposited within at least one of holes and trenches formed in a dielectric such as TEOS.

Preferably, in the method of polishing a substrate of the present invention, the water contained, as an initial component, in the chemical mechanical polishing composition provided is at least one of deionized and distilled to limit incidental impurities.

Preferably, in the method of polishing a substrate of the present invention, the chemical mechanical polishing composition provided contains, as an initial component, an oxidizing agent, wherein the oxidizing agent is selected from the group consisting of hydrogen peroxide ($H_2O_2$), monopersulfates, iodates, magnesium perphthalate, peracetic acid and other per-acids, persulfate, bromates, perbromate, persulfate, peracetic acid, periodate, nitrates, iron salts, cerium salts, Mn (III), Mn (IV) and Mn (VI) salts, silver salts, copper salts, chromium salts, cobalt salts, halogens, hypochlorites and a mixture thereof. More preferably, the oxidizing agent is selected from hydrogen peroxide, perchlorate, perbromate; periodate, persulfate and peracetic acid. Most preferably, the oxidizing agent is hydrogen peroxide.

Preferably, in the method of polishing a substrate of the present invention, the chemical mechanical polishing composition provided contains, as an initial component, 0.01 to 10 wt %, more preferably, 0.1 to 5 wt %; most preferably, 1 to 3 wt % of an oxidizing agent.

Preferably, in the method of polishing a substrate of the present invention, the chemical mechanical polishing composition provided contains, as an initial component, a source of iron (III) ions. More preferably, in the method of the present invention, the chemical mechanical polishing composition provided contains, as an initial component, a source of iron (III) ions, wherein the source of iron (III) ions is selected from the group consisting of iron (III) salts. Most preferably, in the method of the present invention, the chemical mechanical polishing composition provided contains, as an initial component, a source of iron (III) ions, wherein the source of iron (III) ions is ferric nitrate nonahydrate, (Fe(NO$_3$)$_3$.9H$_2$O).

Preferably, in the method of polishing a substrate of the present invention, the chemical mechanical polishing composition provided contains, as an initial component, a source of iron (III) ions sufficient to introduce 1 to 200 ppm, preferably, 5 to 150 ppm, more preferably, 7.5 to 125 ppm, most preferably, 10 to 100 ppm of iron (III) ions to the chemical mechanical polishing composition.

Preferably, in the method of polishing a substrate of the present invention, the chemical mechanical polishing composition provided contains, as an initial component, a source of iron (III) ions. More preferably, in the method of polishing a substrate of the present invention, the chemical mechanical polishing composition provided contains, as an initial component, 100 to 1,000 ppm, preferably, 150 to 750 ppm, more preferably, 200 to 500 ppm and most preferably, 250 to 400 ppm of a source of iron (III) ions. Most preferably, in the method of polishing a substrate of the present invention, the chemical mechanical polishing composition provided contains, as an initial component, 100 to 1,000 ppm, preferably, 150 to 750 ppm, more preferably, 200 to 500 ppm, most preferably, 250 to 400 ppm of a source of iron (III) ions, wherein the source of iron (III) ions is ferric nitrate nonahydrate, $(Fe(NO_3)_3 \cdot 9H_2O)$.

Preferably, in the method of polishing a substrate of the present invention, the chemical mechanical polishing composition provided contains, as an initial component, a quaternary phosphonium compound in amounts of less than 1000 ppm but greater than 0 ppm having a formula:

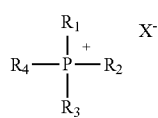

(I)

where $R_1$, $R_2$, $R_3$ and $R_4$ independently comprise hydrogen; linear or branched $(C_1-C_{20})$alkyl, preferably linear or branched $(C_1-C_{16})$alkyl, more preferably linear or branched $(C_4-C_{16})$ alkyl; linear or branched hydroxy$(C_1-C_{10})$alky, more preferably linear or branched hydroxy$(C_1-C_8)$alky, even more preferably linear or branched hydroxy$(C_1-C_4)$alkyl; linear or branched $(C_1-C_{10})$alkoxy, preferably linear or branched $(C_1-C_8)$alkoxy, more preferably linear or branched $(C_1-C_4)$alkoxy; linear or branched, amino$(C_1-C_8)$alkyl, more preferably linear or branched amino$(C_1-C_4)$alkyl; linear or branched halo$(C_1-C_8)$alkyl, more preferably linear or branched halo$(C_1-C_4)$alkyl; linear or branched carboxy$(C_1-C_8)$alkyl, more preferably linear or branched carboxy$(C_1-C_4)$alkyl; acetonyl; allyl; substituted or unsubstituted aryl, preferably substituted or unsubstituted phenyl; substituted or unsubstituted phenyl$(C_1-C_8)$alkyl, preferably substituted or unsubstituted phenyl$(C_1-C_4)$alkyl; substituted or unsubstituted phenyl$(C_1-C_8)$alkoxy, preferably substituted or unsubstituted phenyl$(C_1-C_4)$alkoxy; $(C_2-C_4)$alkylphosphonium moiety, preferably a $(C_4)$alkylphosphonium moiety; or a heterocyclic$(C_1-C_5)$alkyl moiety such as a dioxolan$(C_1-C_2)$alkyl moiety or pyridyl$(C_1-C_2)$alkyl moiety, preferably a heterocyclic$(C_1-C_2)$alkyl moiety where the heterocyclic moiety is a dioxolan moiety; and with the proviso that $R_1$, $R_2$, $R_3$ and $R_4$ are not all hydrogen at the same instance and, preferably, are not all butyl $(C_4)$alkyl at the same instance; and $X^-$ is a bromide, chloride, fluoride, iodide or hydroxide ion with the proviso that when $X^-$ is hydroxide ion $R_1$, $R_2$, $R_3$ and $R_4$ cannot be butyl in the same instance, preferably $X^-$ is bromide, chloride or fluoride, more preferably bromide or chloride. It is even more preferred that $R_1$, $R_2$ and $R_3$ are linear or branched $(C_4-C_8)$alkyl and $R_4$ is linear or branched $(C_8-C_{16})$alkyl, and it is most preferred that $R_1$, $R_2$ and $R_3$ are linear $(C_4)$alkyl, and $R_4$ is linear $(C_8)$alkyl, $(C_{12})$alkyl or $(C_{16})$alkyl. It is also preferred that when $R_1$, $R_2$, $R_3$ and $R_4$ are hydroxyalkyl, $R_1$, $R_2$, $R_3$ and $R_4$ are independently chosen from hydroxy$(C_1-C_2)$alkyl, most preferably $R_1$, $R_2$, $R_3$, and $R_4$ are hydroxy$(C_1)$alkyl or hydroxymethyl moiety. Substituent groups on the aryl moiety, preferably the phenyl moiety, include sulfonyl; nitro; cyano; hydroxyl; hydroxyalkyl, alkoxy; alkoxyalkyl; halo group, where the halo group is preferably bromine or chlorine; haloalkyl; and $(C_1-C_4)$alkylphosphonium, more preferably $(C_3)$alkylphosphonium.

Examples of compounds of the present invention are hexadecyltributyl phophonium bromide, tributyldodecylphosphonium bromide, tributyl-n-octylphosphonium bromide, tetra-n-octylphosphonium bromide, trihexyltetradecyl phosphonium chloride, tetrakis(hydroxymethyl) phosphonium chloride, tetraphenyl phosphonium bromide, methyl triphenyl phosphonium bromide, triphenyl phosphonium ylide, benzyl triphenyl phosphonium bromide, triphenyl (bromomethyl) phosphonium bromide, [(benzyloxy)methyl] (triphenyl) phosphonium chloride, isopropyl triphenyl phosphonium bromide, allyltriphenyl phosphonium chloride, acetonyltriphenyl phosphonium chloride, (3-aminopropyl) (triphenyl) phosphonium bromide, tetrakis(diethylamino) phosphonium bromide, tributyl-2-4-dichlorobenzyl-phosphonium chloride, ethyltriphenyl phosphonium bromide, triphenyl (2-pyridylmethyl) phosphonium chloride, tributyl (1,3-dioxolan-2-ylmethyl) phosphonium bromide, 1,3-propanediyl-bis(tripropylphosphonium) difluoride and 1,3,5-tris[(tripropylphosphonium)methyl]benzene trifluoride. Examples of preferred compounds of the present invention are hexadecyltributyl phophonium bromide, tributyldodecylphosphonium bromide, tributyl-n-octylphosphonium bromide, tetra-n-octylphosphonium bromide and tetrakis (hydroxymethyl) phosphonium chloride. The most preferred compounds of the present invention are hexadecyltributyl phosphonium bromide, tributyldodecylphosphonium bromide, tributyl-n-octylphosphonium bromide and tetrakis(hydroxymethyl) phosphonium chloride.

Preferably, in the method of polishing a substrate of the present invention, the chemical mechanical polishing composition provided contains, as an initial component less than 1000 ppm but greater than 0 ppm, more preferably 5 ppm to less than 1000 ppm, even more preferably from 5 ppm to 500 ppm, still more preferably from 5 ppm to 250 ppm, and most preferably from 10 ppm to 100 ppm of the quaternary phosphonium compounds of the present invention.

Preferably, in the method of polishing a substrate of the present invention, the chemical mechanical polishing composition provided contains a colloidal silica abrasive having a negative zeta potential. A negative zeta potential is preferred because a colloidal silica abrasive having a positive zeta potential can aggravate tungsten dishing and erosion. More preferably, in the method of polishing a substrate of the present invention, the chemical mechanical polishing composition provided contains a colloidal silica abrasive having a permanent negative zeta potential, wherein the chemical mechanical polishing composition has a pH of 1 to 7, preferably, of 1.5 to 4.5; more preferably, of 1.5 to 3.5; still more preferably, of 2 to 3. Still more preferably, in the method of polishing a substrate of the present invention, the chemical mechanical polishing composition provided contains a colloidal silica abrasive having a permanent negative zeta potential, wherein the chemical mechanical polishing composition has a pH of 1 to 7, preferably, of 1.5 to 4.5; more preferably, of 1.5 to 3.5; still more preferably, of 2 to 3 as indicated by a zeta potential from −0.1 mV to −20 mV.

Preferably, in the method of polishing a substrate of the present invention, the chemical mechanical polishing composition provided contains, as an initial component, a colloidal silica abrasive, wherein the colloidal silica abrasive has an average particle size≤200 nm, preferably, 5 to 150 nm; more preferably, 10 to 100 nm; most preferably, 20 to 60 nm as measured by dynamic light scattering techniques.

Preferably, in the method of polishing a substrate of the present invention, the chemical mechanical polishing composition provided contains 0.01 to 10 wt %, preferably 0.05 to 7.5 wt %, more preferably, 0.1 to 5 wt %, most preferably, 0.2 to 4 wt % of a colloidal silica abrasive. Preferably the colloidal silica abrasive has a negative zeta potential.

Preferably, in the method of polishing a substrate of the present invention, the chemical mechanical polishing composition provided contains, as an initial component, a dicarboxylic acid, salts thereof, or mixtures thereof, wherein the dicarboxylic acid includes, but is not limited to malonic acid, oxalic acid, succinic acid, adipic acid, maleic acid, malic acid, glutaric acid, tartaric acid, salts thereof or mixtures thereof. More preferably, in the method of polishing a substrate of the present invention, the chemical mechanical polishing composition provided contains, as an initial component, a dicarboxylic acid, wherein the dicarboxylic acid is selected from the group consisting of malonic acid, oxalic acid, succinic acid, tartaric acid, salts thereof and mixtures thereof. Still more preferably the chemical mechanical polishing composition provided contains, as an initial component, a dicarboxylic acid, wherein the dicarboxylic acid is selected from the group consisting of malonic acid, oxalic acid, succinic acid, salts thereof and mixtures thereof. Most preferably in the method of polishing a substrate of the present invention, the chemical mechanical polishing composition provided contains, as an initial component, the dicarboxylic acid malonic acid, salts thereof, or mixtures thereof.

Preferably, in the method of polishing a substrate of the present invention, the chemical mechanical polishing composition provided contains, as an initial component, 1 to 2,600 ppm, preferably, 100 to 1,400 ppm, more preferably, 120 to 1,350 ppm, still more preferably, 130 to 1,100 ppm, of a dicarboxylic acid, salt thereof, or mixtures thereof, wherein the dicarboxylic acid includes, but is not limited to malonic acid, oxalic acid, succinic acid, adipic acid, maleic acid, malic acid, glutaric acid, tartaric acid, salts thereof or mixtures thereof. More preferably, in the method of polishing a substrate of the present invention, the chemical mechanical polishing composition provided contains, as an initial component, 1 to 2,600 ppm of a dicarboxylic acid, salt thereof, or mixtures thereof. Most preferably, in the method of polishing a substrate of the present invention, the chemical mechanical polishing composition provided contains, as an initial component 100 to 1,400 ppm, more preferably, 120 to 1,350 ppm, still more preferably, 130 to 1,350 ppm, the dicarboxylic acid malonic acid, salts thereof, or mixtures thereof.

Preferably, in the method of polishing a substrate of the present invention, the chemical mechanical polishing composition provided has a pH of 1 to 7. More preferably, in the method of polishing a substrate of the present invention, the chemical mechanical polishing composition provided has a pH of 1.5 to 4.5. Still more preferably, in the method of polishing a substrate of the present invention, the chemical mechanical polishing composition provided has a pH of 1.5 to 3.5. Most preferably, in the method of polishing a substrate of the present invention, the chemical mechanical polishing composition provided has a pH of 2 to 3.

Preferably, in the method of polishing a substrate of the present invention, the chemical mechanical polishing composition provided optionally contains a pH adjusting agent. Preferably, the pH adjusting agent is selected from the group consisting of inorganic and organic pH adjusting agents. Preferably, the pH adjusting agent is selected from the group consisting of inorganic acids and inorganic bases. More preferably, the pH adjusting agent is selected from the group consisting of phosphoric acid and potassium hydroxide. Most preferably, the pH adjusting agent is potassium hydroxide.

Preferably, in the method of polishing a substrate of the present invention, the chemical mechanical polishing pad provided can by any suitable polishing pad known in the art. One of ordinary skill in the art knows to select an appropriate chemical mechanical polishing pad for use in the method of the present invention. More preferably, in the method of polishing a substrate of the present invention, the chemical mechanical polishing pad provided is selected from woven and non-woven polishing pads. Still more preferably, in the method of polishing a substrate of the present invention, the chemical mechanical polishing pad provided comprises a polyurethane polishing layer. Most preferably, in the method of polishing a substrate of the present invention, the chemical mechanical polishing pad provided comprises a polyurethane polishing layer containing polymeric hollow core microparticles and a polyurethane impregnated non-woven subpad. Preferably, the chemical mechanical polishing pad provided has at least one groove on the polishing surface.

Preferably, in the method of polishing a substrate of the present invention, the chemical mechanical polishing composition provided is dispensed onto a polishing surface of the chemical mechanical polishing pad provided at or near an interface between the chemical mechanical polishing pad and the substrate.

Preferably, in the method of polishing a substrate of the present invention, dynamic contact is created at the interface between the chemical mechanical polishing pad provided and the substrate with a down force of 0.69 to 34.5 kPa normal to a surface of the substrate being polished.

Preferably, in the method of polishing a substrate of the present invention, wherein the chemical mechanical polishing composition provided has a tungsten removal rate≥1,000 Å/min; preferably, ≥1,500 Å/min; more, ≥2,000 Å/min. More preferably, in the method of polishing a substrate of the present invention, wherein the chemical mechanical polishing composition provided has a tungsten removal rate of ≥1,000 Å/min; preferably, ≥1,500 Å/min; more preferably, ≥2,000 Å/min; and a W/TEOS selectivity of ≥5. Still more preferably, in the method of polishing a substrate of the present invention, wherein the tungsten is removed from the substrate at a removal rate of ≥1,000 Å/min; preferably, ≥1,500 Å/min; more preferably, ≥2,000 Å/min; and a W/TEOS selectivity of 5 to 20. Most preferably, in the method of polishing the substrate of the present invention, wherein the tungsten is removed from the substrate at a removal rate of ≥1,000 Å/min; preferably, ≥1,500 Å/min; more preferably, ≥2,000 Å/min; and a W/TEOS selectivity and with a platen speed of 80 revolutions per minute, a carrier speed of 81 revolutions per minute, a chemical mechanical polishing composition flow rate of 125 mL/min, a nominal down force of 21.4 kPa on a 200 mm polishing machine; and, wherein the chemical mechanical polishing pad comprises a polyurethane polishing layer containing polymeric hollow core microparticles and a polyurethane impregnated non-woven subpad.

As is illustrated in the following Examples, the tungsten CMP methods and compositions of the present invention containing select quaternary phosphonium compounds at concentrations of less than 1000 ppm but greater than 0 can at least reduce corrosion rate of tungsten.

Example 1

Quaternary Phosphonium Slurry Formulations

The chemical mechanical polishing compositions of this Example were prepared by combining the components in the amounts listed in Table 1 with the balance being DI water and adjusting the pH of the compositions to the final pH listed in Table 1 with 45 wt % potassium hydroxide.

TABLE 1

| Slurry # | Abrasive[1] (wt %) | Quaternary Phosphonium Compound (ppm) | $Fe(NO_3)_3$ (ppm) | Malonic Acid (ppm) | $H_2O_2$ (wt %) | pH |
|---|---|---|---|---|---|---|
| CS1 | 2 | — | 362 | 1320 | 2 | 2.3 |
| S1 | 2 | P[1,1,1,1] 100 | 362 | 1320 | 2 | 2.3 |
| S2 | 2 | P[1,1,1,1] 250 | 362 | 1320 | 2 | 2.3 |
| S3 | 2 | P[1,1,1,1] 500 | 362 | 1320 | 2 | 2.3 |
| S4 | 2 | $PPh_4$ 50 | 362 | 1320 | 2 | 2.3 |
| S5 | 2 | $PPh_4$ 250 | 362 | 1320 | 2 | 2.3 |
| S6 | 2 | P[6,6,6,14] 50 | 362 | 1320 | 2 | 2.3 |
| S7 | 2 | P[6,6,6,14] 250 | 362 | 1320 | 2 | 2.3 |
| S8 | 2 | $DiP^+$ 150 | 362 | 1320 | 2 | 2.3 |
| S9 | 2 | $DiP^+$ 750 | 362 | 1320 | 2 | 2.3 |
| S10 | 2 | $TriP^+$ 150 | 362 | 1320 | 2 | 2.3 |
| S11 | 2 | $TriP^+$ 750 | 362 | 1320 | 2 | 2.3 |
| S12 | 2 | P[4,4,4,16] 30 | 362 | 1320 | 2 | 2.3 |
| S13 | 2 | P[4,4,4,16] 250 | 362 | 1320 | 2 | 2.3 |

[1]KLEBOSOL ™ 1598-B25 (-) zeta potential abrasive slurry manufactured by AZ Electronics Materials, available from The Dow Chemical Company.

Example 2

Corrosion Rate Inhibition Performance of Quaternary Phosphonium CMP Slurries

The corrosion tests were carried out by immersing W blanket wafers (1 cm×4 cm) in 15 g slurry samples. The W wafers were removed from tested slurries after 10 min. The solutions were subsequently centrifuged for 20 min at 9,000 rpm to remove slurry particles. The supernatant was analyzed by ICP-OES to determine the amount of tungsten by weight. The corrosion rate (Å/min) was converted from the W mass assuming an etching wafer surface area of 4 $cm^2$. The results of the corrosion tests are in Table 2.

TABLE 2

| Slurry # | W Corrosion Rate (Å/min) |
|---|---|
| CS1 | 28 |
| S1 | 22 |
| S2 | 19 |
| S3 | 18 |
| S4 | 27 |
| S5 | 29 |
| S6 | 21 |
| S7 | 14 |
| S8 | 22 |
| S9 | 5.3 |
| S10 | 12 |
| S11 | 4.1 |
| S12 | 22 |
| S13 | 0.4 |

Overall, the results of the corrosion rate tests showed that the chemical mechanical polishing slurries containing quaternary phosphonium compounds effectively reduced the corrosion on W containing wafers in contrast to the control (CS1) which excluded the quaternary phosphonium compounds.

Example 3

Quaternary Phosphonium Slurry Formulations

The chemical mechanical polishing compositions of this Example were prepared by combining the components in the amounts listed in Table 3 with the balance being DI water and adjusting the pH of the compositions to the final pH listed in Table 3 with 45 wt % potassium hydroxide.

TABLE 3

| Slurry # | Abrasive[1] (wt %) | Quaternary Phosphonium Compound (ppm) | $Fe(NO_3)_3$ (ppm) | Malonic Acid (ppm) | $H_2O_2$ (wt %) | pH |
|---|---|---|---|---|---|---|
| CS2 | 2 | — | 362 | 1320 | 2 | 2.3 |
| S14 | 2 | P[4,4,4,8] 80 | 362 | 1320 | 2 | 2.3 |
| S15 | 2 | P[4,4,4,12] 20 | 362 | 1320 | 2 | 2.3 |
| S16 | 2 | P[4,4,4,12] 50 | 362 | 1320 | 2 | 2.3 |
| S17 | 2 | P[4,4,4,12] 80 | 362 | 1320 | 2 | 2.3 |
| S18 | 2 | P[4,4,4,16] 20 | 362 | 1320 | 2 | 2.3 |

[1]KLEBOSOL ™ 1598-B25 (-) zeta potential abrasive slurry manufactured by AZ Electronics Materials, available from The Dow Chemical Company.

Example 4

Chemical Mechanical Polishing—Dishing and Erosion Performance of Quaternary Phosphonium CMP Slurries The polishing experiments were performed on 200 mm blanket wafers installed on an Applied Materials 200 mm MIRRA® polishing machine. The polishing removal rate experiments were performed on 200 mm blanket 15 kÅ-thick TEOS sheet wafers from Novellus and W, blanket wafers available from WaferNet Inc., Silicon Valley Microelectronics. All polishing experiments were performed using an IC1010™ polyurethane polishing pad paired with an SP2310 subpad (commercially available from Rohm and Haas Electronic Materials CMP Inc.) with a typical down pressure of 21.4 kPa (3.1 psi), a chemical mechanical polishing composition flow rate of 125 mL/min, a table rotation speed of 80 rpm and a carrier rotation speed of 81 rpm unless specified otherwise. A Kinik PDA33A-3 diamond pad conditioner (commercially available from Kinik Company) was used to dress the polishing pad. The polishing pad was broken in with the conditioner using a down force of 9.0 lbs (4.1 kg) for 15 minutes and 7.0 lbs (3.2 kg) for 15 minutes at 80 rpm (platen)/36 rpm (conditioner). The polishing pad was further conditioned ex-situ prior to polishing using a down force of 7 lbs (3.2 kg) for 24 seconds. The TEOS erosion depths were determined by measuring the film thickness before and after polishing using a KLA-Tencor FX200 metrology tool. The W removal and dishing rates were determined using a KLA-Tencor RS100C metrology tool. The wafers had varying standard line width features as shown in Tables 4A and 4B. In the tables of this example the numerator refers to W and the denominator refers to TEOS.

4A

| Slurry # | 50/50 μm dishing (Å) | 50/50 μm erosion (Å) | 10/10 μm dishing (Å) | 10/10 μm erosion (Å) | 7/3 μm dishing (Å) | 7/3 μm erosion (Å) |
|---|---|---|---|---|---|---|
| CS2 | 1357 | 44 | 728 | 234 | 472 | 628 |
| S14 | 1200 | 21 | 687 | 177 | 437 | 529 |
| S15 | 1307 | 24 | 694 | 247 | 444 | 580 |
| S16 | 1161 | 23 | 587 | 214 | 378 | 601 |
| S17 | 1091 | 24 | 560 | 253 | 339 | 573 |
| S18 | 1183 | 33 | 628 | 231 | 395 | 531 |

4B

| Slurry # | 9/1 μm dishing (Å) | 9/1 μm erosion (Å) | 0.25/0.25 μm dishing (Å) | 0.25/0.25 μm erosion (Å) |
|---|---|---|---|---|
| CS2 | 364 | 1230 | 184 | 434 |
| S14 | 333 | 987 | 157 | 371 |
| S15 | 346 | 1049 | 163 | 258 |
| S16 | 232 | 1157 | 142 | 391 |
| S17 | 245 | 944 | 133 | 483 |
| S18 | 289 | 968 | 132 | 291 |

Overall the quaternary phosphonium compounds showed decreased tungsten dishing and TEOS erosion in view of the control polishing composition at the feature sizes disclosed in the tables.

Example 5

Quaternary Phosphonium Slurry Formulations

The chemical mechanical polishing compositions of this Example were prepared by combining the components in the amounts listed in Table 5 with the balance being DI water and adjusting the pH of the compositions to the final pH listed in Table 5 with 45 wt % potassium hydroxide.

TABLE 5

| Slurry # | Abrasive[1] (wt %) | Quaternary Phosphonium Compound (ppm) | Fe(NO$_3$)$_3$ (ppm) | Malonic Acid (ppm) | H$_2$O$_2$ (wt %) | pH |
|---|---|---|---|---|---|---|
| CS3 | 2 | — | 362 | 1320 | 2 | 2.3 |
| S19 | 2 | P[6,6,6,14] 100 | 362 | 1320 | 2 | 2.3 |
| S20 | 2 | P[6,6,6,14] 500 | 362 | 1320 | 2 | 2.3 |

[1]KLEBOSOL ™ 1598-B25 (-) zeta potential abrasive slurry manufactured by AZ Electronics Materials, available from The Dow Chemical Company.

Example 6

Chemical Mechanical Polishing—Dishing and Erosion Performance of Quaternary Phosphonium CMP Slurries The chemical mechanical polishing steps, parameters and W and TEOS wafer substrates for testing the dishing and erosion of W and TEOS, respectively, for the slurry formulations: CS3 (control), S19 and S20 were substantially the same as those described in Example 4 above. The results are disclosed in Tables 6A and 6B. In the tables of this example the numerator refers to W and the denominator refers to TEOS.

6A

| Slurry # | 100/100 μm dishing (Å) | 100/100 μm erosion (Å) | 50/50 μm dishing (Å) | 50/50 μm erosion (Å) | 10/10 μm dishing (Å) | 10/10 μm erosion (Å) |
|---|---|---|---|---|---|---|
| CS3 | 1623 | 62 | 1473 | 144 | 815 | 565 |
| S19 | 1043 | 11 | 1028 | 23 | 614 | 215 |
| S20 | 952 | 3 | 893 | 15 | 542 | 186 |

6B

| Slurry # | 7/3 μm dishing (Å) | 7/3 μm erosion (Å) | 9/1 μm dishing (Å) | 9/1 μm erosion (Å) | 0.25/0.25 μm dishing (Å) | 0.25/0.25 μm erosion (Å) |
|---|---|---|---|---|---|---|
| CS3 | 342 | 1191 | 196 | 1527 | 151 | 907 |
| S19 | 379 | 581 | 292 | 955 | 160 | 333 |
| S20 | 338 | 256 | 256 | 798 | 147 | 323 |

Overall the tungsten dishing and the TEOS erosion were reduced when the quaternary phosphonium compounds P[6,6,6,14] were included in the polishing composition. Best results were achieved at the larger feature sizes of 100/100 μm, 50/50 μm and 10/10 μm.

Example 7

W, TEOS Removal Rate and W, TEOS Maximum Polishing Temperature

The polishing experiments for W and TEOS removal rates were performed substantially as described in Example 4 using the same apparatus and parameters. The wafers were from WaferNet Inc., or Silicon Valley Microelectronics. The results are in Table 7.

TABLE 7

| Slurry # | W RR (Å/min) | TEOS RR (Å/min) | W/TEOS Selectivity | W Temp. (° C.) | TEOS Temp. (° C.) |
|---|---|---|---|---|---|
| CS2 | 1967 | 173 | 11.4 | 39 | 35 |
| S14 | 2379 | 188 | 12.6 | 37 | 32 |
| S15 | 2445 | 162 | 15.1 | 39 | 33 |
| S16 | 2419 | 186 | 13 | 38 | 33.5 |
| S17 | 2049 | 189 | 10.9 | 34 | 32.5 |

The quaternary phosphonium chemical mechanical polishing compositions of the present invention showed overall good W RR of greater than 2000 Å/min and good W/TEOS selectivity.

Example 8

Quaternary Phosphonium Slurry Formulations and Stability Test

The chemical mechanical polishing compositions of this Example were prepared by combining the components in the amounts listed in Table 8A with the balance being DI water and adjusting the pH of the compositions to the final pH listed in Table 8A with 45 wt % potassium hydroxide.

TABLE 8A

| Slurry # | Abrasive[1] (wt %) | Quaternary Phosphonium Compound P[1,1,1,1] | Fe(NO$_3$)$_3$ (ppm) | Malonic Acid (ppm) | H$_2$O$_2$ (wt %) | pH |
|---|---|---|---|---|---|---|
| CS4 | 2 | — | 362 | 1320 | 2 | 2.3 |
| S21 | 2 | 100 ppm (0.01 wt %) | 362 | 1320 | 2 | 2.3 |
| S22 | 2 | 500 ppm (0.05 wt %) | 362 | 1320 | 2 | 2.3 |
| S23 | 2 | 1000 ppm (0.1 wt %) | 362 | 1320 | 2 | 2.3 |
| S24 | 2 | 1500 ppm (0.15 wt %) | 362 | 1320 | 2 | 2.3 |

[1]KLEBOSOL ™ 1598-B25 (-) zeta potential abrasive slurry manufactured by AZ Electronics Materials, available from The Dow Chemical Company.

The average particle size for the colloidal silica abrasive is shown in Table 8B below as well as the zeta potential. The zeta potential was measured for each slurry 24 hours after make-up using a Matec ESA9800 zeta acoustic analyzer for measuring zeta potential (available from Matec Applied Sciences). Each slurry sample was placed in a cup and the zeta potential was measured using a probe. Five measurements were taken for each sample and the average zeta potential was determined for each sample. The average for each slurry is in Table 8B.

TABLE 8B

| Slurry # | Particle Size (nm) | Zeta Potential (mV) |
|---|---|---|
| CS4 | 43 | −8 |
| S21 | 42 | −7 |
| S22 | 42 | −5 |
| S23 | 43 | +1 |
| S24 | 44 | +3 |

Although there was no indication of particle agglomeration at the concentrations of P[1,1,1,1] at 1000 ppm and 1500 ppm, the colloidal silica particles went from a (−) zeta potential to a (+) zeta potential indicating instability of the CMP compositions containing P[1,1,1,1] at 1000 ppm and 1500 ppm.

Example 9

Quaternary Phosphonium Slurry Formulations and Stability Test

The chemical mechanical polishing compositions of this Example were prepared by combining the components in the amounts listed in Table 9A with the balance being DI water and adjusting the pH of the compositions to the final pH listed in Table 9A with 45 wt % potassium hydroxide.

TABLE 9A

| Slurry # | Abrasive[1] (wt %) | Quaternary Phosphonium Compound P[4,4,4,16] | Fe(NO$_3$)$_3$ (ppm) | Malonic Acid (ppm) | H$_2$O$_2$ (wt %) | pH |
|---|---|---|---|---|---|---|
| CS4 | 2 | — | 362 | 1320 | 2 | 2.3 |
| S25 | 2 | 30 ppm (0.003 wt %) | 362 | 1320 | 2 | 2.3 |
| S26 | 2 | 50 ppm (0.005 wt %) | 362 | 1320 | 2 | 2.3 |
| S27 | 2 | 150 ppm (0.015 wt %) | 362 | 1320 | 2 | 2.3 |
| S28 | 2 | 1000 ppm (0.1 wt %) | 362 | 1320 | 2 | 2.3 |
| S29 | 2 | 1500 ppm (0.15 wt %) | 362 | 1320 | 2 | 2.3 |

[1]KLEBOSOL ™ 1598-B25 (-) zeta potential abrasive slurry manufactured by AZ Electronics Materials, available from The Dow Chemical Company.

The average particle size for the colloidal silica abrasive is shown in Table 9B below as well as the zeta potential. The zeta potentials were measured using the Matec ESA9800 zeta acoustic analyzer as described above in Example 8. The average zeta potentials for each slurry in in Table 9B.

TABLE 9B

| Slurry # | Particle Size (nm) | Zeta Potential (mV) |
|---|---|---|
| CS4 | 43 | −8 |
| S25 | 66 | −6 |
| S26 | 72 | −7 |
| S27 | 168 | −4 |
| S28 | 6526 | +89 |
| S29 | 6169 | +96 |

In addition to the zeta potential of the colloidal silica particles going from a (−) potential to a (+) potential, the large increase in particle size for P[4,4,4,16] at concentrations of 1000 ppm and 1500 ppm indicated that there was severe aggregation of the particles. Precipitate was also observed at both P[4,4,4,16] concentrations. The CMP formulations of P[4,4,4,16] at concentrations of 1000 ppm and 1500 ppm were unstable.

Example 10 (Comparative)

Quaternary Phosphonium Hydroxide Salt Slurry Formulations

The chemical mechanical polishing compositions of this Comparative Example were prepared by combining the components in the amounts listed in Table 10 with the balance being DI water and adjusting the pH of the compositions to the final pH listed in Table 10 with 45 wt % potassium hydroxide.

TABLE 10

| Slurry # | Abrasive[1] (wt %) | Quaternary Phosphonium Hydroxide Salt (ppm) | Fe(NO$_3$)$_3$ (ppm) | Malonic Acid (ppm) | H$_2$O$_2$ (wt %) | pH |
|---|---|---|---|---|---|---|
| CS1 | 2 | — | 362 | 1320 | 2 | 2.3 |
| SC1 | 2 | P[4,4,4,4] 50 | 362 | 1320 | 2 | 2.3 |
| SC2 | 2 | P[4,4,4,4] 250 | 362 | 1320 | 2 | 2.3 |
| SC3 | 2 | P[4,4,4,4] 1000 | 362 | 1320 | 2 | 2.3 |

[1]KLEBOSOL ™ 1598-B25 (-) zeta potential abrasive slurry manufactured by AZ Electronics Materials, available from The Dow Chemical Company.

Example 11 (Comparative)

Corrosion Rate Inhibition Performance of Quaternary Phosphonium Hydroxide Salt CMP Slurries Corrosion tests were carried out for the CMP comparative slurries disclosed in Table 10 by immersing W blanket wafers (1 cm×4 cm) in 15 g slurry samples according to the procedure described in Example 2 above. The results are disclosed in Table 11.

TABLE 11

| Slurry # | W Corrosion Rate (Å/min) |
|---|---|
| CS1 | 28 |
| SC1 | 31 |
| SC2 | 34 |
| SC3 | 36 |

The results in Table 11 show that the hydroxide salt of the quaternary phosphonium compound P[4,4,4,4] increased the corrosion rate of the slurry.

Example 12 (Comparative)

Quaternary Phosphonium Hydroxide Salt Slurry Formulations and Stability Test

The chemical mechanical polishing compositions of this Example were prepared by combining the components in the amounts listed in Table 12A with the balance being DI water and adjusting the pH of the compositions to the final pH listed in Table 12A with 45 wt % potassium hydroxide.

TABLE 12A

| Slurry # | Abrasive[1] (wt %) | Quaternary Phosphonium Hydroxide Salt P[4,4,4,4] | Fe(NO$_3$)$_3$ (ppm) | Malonic Acid (ppm) | H$_2$O$_2$ (wt %) | pH |
|---|---|---|---|---|---|---|
| CS4 | 2 | — | 362 | 1320 | 2 | 2.3 |
| SC4 | 2 | 100 ppm (0.01 wt %) | 362 | 1320 | 2 | 2.3 |
| SC5 | 2 | 500 ppm (0.05 wt %) | 362 | 1320 | 2 | 2.3 |
| SC6 | 2 | 1000 ppm (0.1 wt %) | 362 | 1320 | 2 | 2.3 |
| SC7 | 2 | 1500 ppm (0.15 wt %) | 362 | 1320 | 2 | 2.3 |

[1]KLEBOSOL ™ 1598-B25 (-) zeta potential abrasive slurry manufactured by AZ Electronics Materials, available from The Dow Chemical Company.

The average particle size for the colloidal silica abrasive is shown in Table 12B below as well as the zeta potential. The zeta potential for the comparative slurries was measured using the Matec ESA9800 zeta acoustic analyzer as described above in Example 8. The average values for the zeta potentials are in Table 12B.

TABLE 12B

| Slurry # | Particle Size (nm) | Zeta Potential (mV) |
|---|---|---|
| CS4 | 43 | −8 |
| SC4 | 42 | — |
| SC5 | 42 | +3 |
| SC6 | 43 | +8 |
| SC7 | 44 | +7 |

Although there was no indication of particle agglomeration of P[4,4,4,4], the colloidal silica particles went from a (−) zeta potential to a (+) zeta potential substantially immediately after the colloidal silica particles were mixed with the P[4,4,4,4] at all four concentrations, thus indicating instability of the slurries.

What is claimed is:

1. A method of chemical mechanical polishing tungsten, comprising:
providing a substrate comprising tungsten and a dielectric;
providing a chemical mechanical polishing composition, comprising, as initial components:
water;
an oxidizing agent;
a colloidal silica abrasive;
a dicarboxylic acid, salt thereof or mixtures thereof,
a source of iron (III) ions; and,
optionally, a pH adjusting agent;
a quaternary phosphonium compound in amounts of less than 1000 ppm but greater than 0 ppm, wherein the quaternary phosphonium compound has a formula:

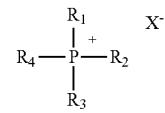

wherein $R_1$, $R_2$, $R_3$ and $R_4$ independently comprise hydrogen; linear or branched alkyl; linear or branched hydroxyalkyl; linear or branched alkoxy; linear or branched, aminoalkyl; linear or branched haloalkyl; linear or branched carboxyalkyl; acetonyl; allyl; substituted or unsubstituted aryl; substituted or unsubstituted arylalkyl; substituted or unsubstituted arylalkoxy; phosphoniumalkyl moiety; or a heterocyclic alkyl moiety; with the proviso that $R_1$, $R_2$, $R_3$ and $R_4$ are not all hydrogen at the same instance and not all are butyl at the same instance; and $X^-$ is a halide ion or hydroxide ion;
providing a chemical mechanical polishing pad, having a polishing surface;
creating dynamic contact at an interface between the chemical mechanical polishing pad and the substrate; and
dispensing the chemical mechanical polishing composition onto the polishing surface of the chemical mechanical polishing pad at or near the interface between the chemical mechanical polishing pad and the substrate to remove at least some of the tungsten.

2. The method of claim 1, wherein the chemical mechanical polishing composition provided has a tungsten removal rate of ≥1,000 Å/min with a platen speed of 80 revolutions per minute, a carrier speed of 81 revolutions per minute, a chemical mechanical polishing composition flow rate of 125 mL/min, a nominal down force of 21.4 kPa on a 200 mm polishing machine; and, wherein the chemical mechanical polishing pad comprises a polyurethane polishing layer containing polymeric hollow core microparticles and a polyurethane impregnated non-woven subpad.

3. The method of claim 1, wherein the chemical mechanical polishing composition, provided comprises, as initial components:
the water;
0.01 to 10 wt % of the oxidizing agent, wherein the oxidizing agent is hydrogen peroxide;
0.01 to 10 wt % of the colloidal silica abrasive;
1 to 1,400 ppm of the dicarboxylic acid, salt thereof or mixtures thereof, wherein the dicarboxylic acid, salt thereof or mixtures thereof is malonic acid, salt thereof or mixtures thereof;
100 to 1,000 ppm of the source of iron (III) ions, wherein the source of iron (III) ions is ferric nitrate nonahydrate; and,
optionally, the pH adjusting agent;

wherein the chemical mechanical polishing composition has a pH of 1 to 7; and, wherein the quaternary phosphonium compound is in amounts of 5 ppm to 500 ppm and wherein $R_1$, $R_2$, $R_3$ and $R_4$ independently comprise hydrogen; linear or branched ($C_1$-$C_{16}$)alkyl; linear or branched hydroxy ($C_1$-$C_4$)alkyl; linear or branched ($C_1$-$C_4$)alkoxy; linear or branched, amino($C_1$-$C_4$)alkyl; linear or branched halo($C_1$-$C_4$)alkyl; linear or branched carboxy($C_1$-$C_4$)alkyl; substituted or unsubstituted phenyl; substituted or unsubstituted phenyl($C_1$-$C_4$)alkyl; substituted or unsubstituted phenyl($C_1$-$C_4$)alkoxy; ($C_2$-$C_4$)alkylphosphonium moiety; or a heterocyclic($C_1$-$C_3$)alkyl moiety; with the proviso that $R_1$, $R_2$, $R_3$, $R_4$ are not all hydrogen at the same instance and are not all butyl at the same instance; and $X^-$ is bromide, chloride or fluoride.

4. The method of claim 3, wherein the chemical mechanical polishing composition provided has a tungsten removal rate of ≥1,000 Å/min with a platen speed of 80 revolutions per minute, a carrier speed of 81 revolutions per minute, a chemical mechanical polishing composition flow rate of 125 mL/min, a nominal down force of 21.4 kPa on a 200 mm polishing machine; and, wherein the chemical mechanical polishing pad comprises a polyurethane polishing layer containing polymeric hollow core microparticles and a polyurethane impregnated non-woven subpad.

5. The method of claim 1, wherein the chemical mechanical polishing composition, provided comprises, as initial components:

the water;

1 to 3 wt % of the oxidizing agent, wherein the oxidizing agent is hydrogen peroxide;

0.2 to 4 wt % of the colloidal silica abrasive;

120 to 1,350 ppm of the dicarboxylic acid, wherein the dicarboxylic acid is malonic acid or salt thereof;

250 to 400 ppm of the source of iron (III) ions, wherein the source of iron (III) ions is ferric nitrate nonahydrate; and, optionally, the pH adjusting agent; and, wherein the chemical mechanical polishing composition has a pH of 2 to 3; and wherein the quaternary phosphonium compound is in amounts of 10 ppm to 100 ppm, wherein $R_1$, $R_2$, $R_3$ and $R_4$ independently comprise hydrogen; linear or branched ($C_4$-$C_{16}$)alkyl; linear or branched hydroxy($C_1$-$C_4$)alkyl; linear or branched, amino($C_1$-$C_4$)alkyl; linear or branched halo ($C_1$-$C_4$)alkyl; substituted or unsubstituted phenyl; or substituted or unsubstituted phenyl($C_1$-$C_4$)alkyl; with the proviso that $R_1$, $R_2$, $R_3$, $R_4$ are not all hydrogen at the same instance and are not all butyl at the same instance; and $X^-$ is bromide or chloride.

6. The method of claim 5, wherein the chemical mechanical polishing composition provided has a tungsten removal rate of ≥1,000 Å/min with a platen speed of 80 revolutions per minute, a carrier speed of 81 revolutions per minute, a chemical mechanical polishing composition flow rate of 125 mL/min, a nominal down force of 21.4 kPa on a 200 mm polishing machine; and, wherein the chemical mechanical polishing pad comprises a polyurethane polishing layer containing polymeric hollow core microparticles and a polyurethane impregnated non-woven subpad.

* * * * *